(12) United States Patent
Thoma

(10) Patent No.: US 6,534,143 B1
(45) Date of Patent: Mar. 18, 2003

(54) PREFABRICATED LAMINATED WOOD MEMBER

(76) Inventor: Erwin Thoma, Steggasse 21, A-5600 St. Johann/Pongau (AT)

(*) Notice: Subject to any disclaimer, the term of this patent is extended or adjusted under 35 U.S.C. 154(b) by 0 days.

(21) Appl. No.: 09/743,503
(22) PCT Filed: Jul. 7, 1999
(86) PCT No.: PCT/AT99/00172
§ 371 (c)(1), (2), (4) Date: Jan. 11, 2001
(87) PCT Pub. No.: WO00/03850
PCT Pub. Date: Jan. 27, 2000

(30) Foreign Application Priority Data

Jul. 13, 1998 (AT) ............................................. 1205/98

(51) Int. Cl.[7] ................................................. B32B 3/10
(52) U.S. Cl. ............................. 428/44; 428/54; 428/60; 428/106; 428/223
(58) Field of Search ............................... 428/50, 54, 55, 428/56, 223, 44, 106, 60; 403/292, 408.1

(56) References Cited

FOREIGN PATENT DOCUMENTS

| AU | 8077082 | 7/1985 |
|---|---|---|
| DE | 727246 | 10/1942 |
| DE | 2745681 | 4/1978 |
| DE | 3840093 | 5/1990 |
| DE | 19533638 | 3/1997 |
| DE | 19537298 | 4/1997 |
| DE | 29721848 | 5/1998 |
| EP | 0194238 | 9/1986 |
| FR | 2659703 | 9/1991 |
| GB | 292734 | 6/1928 |

Primary Examiner—Alexander S. Thomas
(74) Attorney, Agent, or Firm—Dykema Gossett PLLC

(57) ABSTRACT

The present invention relates to a prefabricated laminated wood member (1) having at least three interconnected layers (2a, 2b, 2c, 2d, 2e, 2f) which are made of different kinds of wood (3a, 3b, 3c, 3d, 3e, 3f) arranged in the form of immediately adjacent boards or mounts, wherein the different kinds of wood (3a, 3b, 3c, 3d, 3e, 3f) in at least two adjacent layers (2a, 2b, 2c, 2d, 2e, 2f) have different directions. In order to provide a uniform wood structure, the assembly of individual layers (2a, 2b, 2c, 2d, 2e, 2f) is achieved by using plugs (4) that extend through the layers (2a, 2b, 2c, 2d, 2e, 2f) of wood (3a, 3b, 3c, 3d, 3e, 3f).

12 Claims, 2 Drawing Sheets

PREFABRICATED LAMINATED WOOD MEMBER

BACKGROUND OF THE INVENTION

1. Field of the Invention

The invention relates to a prefabricated laminated wood member.

2. The Prior Art

Prefabricated elements are used in prefabricated construction which are arranged as wall and/or ceiling elements and are mounted at the construction site. It is known to cast such elements as precast concrete parts. It is further known to make such members, if used as wall elements, as light building boards made of wood wool, wood fibres or wood chips. Such light building boards are only suitable as facing tiles, not as supporting elements. Wall elements are further known which consist of a frame which is covered with cover panels and are filled with insulating material. Such elements are also not suitable as supporting elements.

In the field of the construction of lumber houses, framework construction is known in which a supporting frame of the walls is erected of bonded wooden trusses which is then shelved by non-supporting or inadequately supporting materials. Framework construction is therefore not suitable for the prefabricated construction method.

Finally, block construction is known in which massive wooden beams are disposed horizontally in layers. This block construction is also not suitable for the prefabricated construction method. The horizontal arrangement of the beams can lead to different settling behaviour and thus lead to the distortion of the wall.

Various systems are known further in which carriers or the wall or ceiling members consist of bonded or nailed layers of boards.

Known laminated wood members such as panel boards consist of several layers of mutually bonded pieces of wood and are used for interior design and furniture. Emissions are unavoidable as a result of the additional bonding materials. Moreover, bonding materials lead to a diffusion obstruction or inhibition which prevents or impairs the exchange of humidity. Moreover, problems are incurred in the disposal of residual and waste material as a result of chemical bonding materials such as synthetic-resin glues or the like because hazardous compounds are released during incineration. A further disadvantage is that there is very little long-term experience in connection with laminated wood members, so that no reliable statements can be made on the ageing behaviour and quality changes after decades of use as a wall member. Such laminated wood members are shown for example in AU 80 770/82B, SU 1 377 352 A or EP 0 194 238 B.

The use of dowels in another connection is also known per se. Thus, DE 727 246 A shows a corner joint for the production of torsionally rigid window frames in which a groove-and-tongue connection of two components is additionally secured by a dowel. Such corner joints can only be used for specific applications and are not suitable for the arrangement of wall members.

The invention is based on the object of avoiding such disadvantages and of providing a single-material laminated wood member which makes do without glueing and/or flat nail connections. Moreover, a wood structure is to be provided for buildings and supporting frameworks, and houses in particular, which combines the advantages of a massive type of construction with the advantages of the prefabricated construction method.

SUMMARY OF THE INVENTION

This object is achieved in accordance with the invention in such a way that the connection of the individual layers is preferably produced only by means of dowels which usually preferably penetrate the layers of wood in a substantially normal way. In this manner a laminated wood member is created which can be produced completely without chemical or metallic bonding means. A particularly favourable connection of the individual layers is achieved when the dowels are arranged in the manner of a grid. The laminated wood member is preferably made from a single material and exclusively consists of wood. Residual and waste parts can be disposed of without any problems.

In order to improve the static properties and the stiffness of the laminated wood member, the laminated wood member includes at least three layers of wood, with the wood of at least one inner layer preferably being formed by mounts. It is advantageous in particular if at least two layers of mounts arranged in the same direction are provided which are preferably adjacent to one another. At least one outer layer of wood can be formed by boards.

In order to achieve favourable static properties and a high strength of the laminated wood member in the longitudinal direction it is advantageous if the thickness of the layers of wood is between approx. 8 mm and 120 mm. The thickness of the individual layers is determined according to the respective needs, with the innermost layers usually being designed according to static criteria and the outermost layers according to sound- and heat-insulating criteria. The thickness of the layers can therefore increase either from the outside to the inside or from the inside to the outside. It is obviously also possible to provide all layers with the same thickness. The width of the individual wood members can be between 40 mm and 400 mm.

In a particularly preferable embodiment of the invention it is provided that the bonding between the dowels and the wood is substantially produced by the frictional connection as a result of an increase in the volume of the dowels by the humidity balance between the wood of the layers and the dowels. The laminated wood members are produced in such a way that the humidity content of the dowels is decreased below the humidity content of the wood in the layers and the dry dowels are introduced into bores in the layers of the wood, with the cross sections of the dowels and the bores being dimensioned such that as a result of the volumentric expansion of the dowels by the humidity balance between the wood and the dowels a frictional connection is produced. As a result of purposefully employed differences in the wood humidity between the dowels and the wood of the individual layers a particularly high connection quality is achieved. The dowels are dried in a respectively stronger manner than the boards and thus absorb water from the ambient wood for the purpose of humidity balance after the dowelling. This leads to a volumetric expansion and an excellent wedging and extractive resistance of the dowel. Additional security and faster processing is enabled when the dowels are secured by a wedge driven into the face side. The complete hold of the dowels is not immediately achieved in the production of the laminated wood member because the humidity balance requires a certain amount of time. As a result of driving wedges into the dowels the laminated wood member can be removed immediately from the press and comes with the final strength. This allows an acceleration of the production process. In addition to this or as an alternative thereto it is also possible to treat the dowels prior to the driving in with a suitable mixture of curd, lime and water, which particularly increases the swelling effect. A similar composition was known many years ago as casein cold glue and was used in wood joints.

When using the laminated wood elements in accordance with the invention in building construction it is often necessary to prove a high resistance of the elements to shearing forces in the plane of the constructed element for the purpose of absorbing the wind forces of the building. Such transverse forces can occur in the walls of rectangular buildings as a result of the wind load, which transverse forces are aligned parallel to the direction of the wind. In the case of a lack of resistance these transverse forces would lead to the consequence that the laminated wood members would deform in the manner of a parallelogram. Under normal circumstances this deformation is prevented by the friction between the individual wood layers. Since the calculatory proof of the frictional forces is difficult in most cases, a layer of diagonally oriented wood is optionally provided. In this manner it is possible to easily prove the respective strength rates even under high occurring wind forces.

Prefabricated parts for buildings are formed in such a way that several laminated wood members are joined into large-area units such as wall, ceiling and roof elements, with the connections preferably being produced by way of tongue-and-groove joints, halved joints, dovetail joints and/or screws.

The principal idea behind this wood construction method is to produce wall, ceiling and covering elements of different board and wood mount layers, with the individual parts being disposed in different directions in the plane of the element. The connection of the individual layers among one another is produced by a grid of wood dowels. The static requirements placed on the respective element are fulfilled by a respective dimensioning (thickness) of the individual layers according to the use as wall, ceiling or roof element and according to static requirements.

The static properties thus achieved and the stiffness of the individual elements allow constructing buildings over several storeys without an additional frame made of supporting beams or other materials.

In the wall elements, upright mounts within the wood-dowelled interlaminar element absorb the forces through their outstanding supporting strength. In the ceiling and roof areas the occurring forces are absorbed by board or mount layers in the longitudinal direction of the ceiling or roof tension.

As a result of the mutually offset wood fibre in the elements and by the vertical progress of the wood fibres in the wall, no settling of the walls occurs, so that a permanent stability of the buildings is ensured.

Since the elements are solely made of wood there are outstanding properties in respect of building physiology for the buildings constructed therefrom. The walls are completely open to diffusion, so that humidity can diffuse through them. Emissions from synthetic-resin glue are avoided. Moreover, this construction method allows wall constructions of any desired thickness, so that outstanding K-values are enabled with respectively strong superstructures even without additional insulants. The massive wood elements for walls and ceilings offer very favourable sound insulation properties and, due to exclusive production of wood, fulfill all ecological requirements in an oustanding way.

Walls or ceilings consisting of said massive wood elements can be processed in a highly simple and efficient manner. For the purpose of laying pipes and cables it is possible to cut out or drill breakthroughs through the wood elements in a very simple manner. The introduction of nails, screws or dowels into the walls is very easily possible. Moreover, a system of prefabricated cable ducts in the elements can be created in the production by intentionally leaving out individual mounting or board layers and by removing adjacent wood elements or by cutting out breakthroughs.

During the production as prefabricated elements or subsequently at the construction site it is possible to apply to the elements various systems of heat insulation such as complete heat insulation, lathwork and cladding for external walls ventilated at rear.

BRIEF DESCRIPTION OF THE DRAWINGS

The invention is now explained in greater detail by reference to the embodiments shown in the drawings, wherein FIG. 1 schematically shows a perspective view of portion of a laminated wood member in accordance with the invention.

DETAILED DESCRIPTION OF THE PREFERRED EMBODIMENTS

Figure 1:
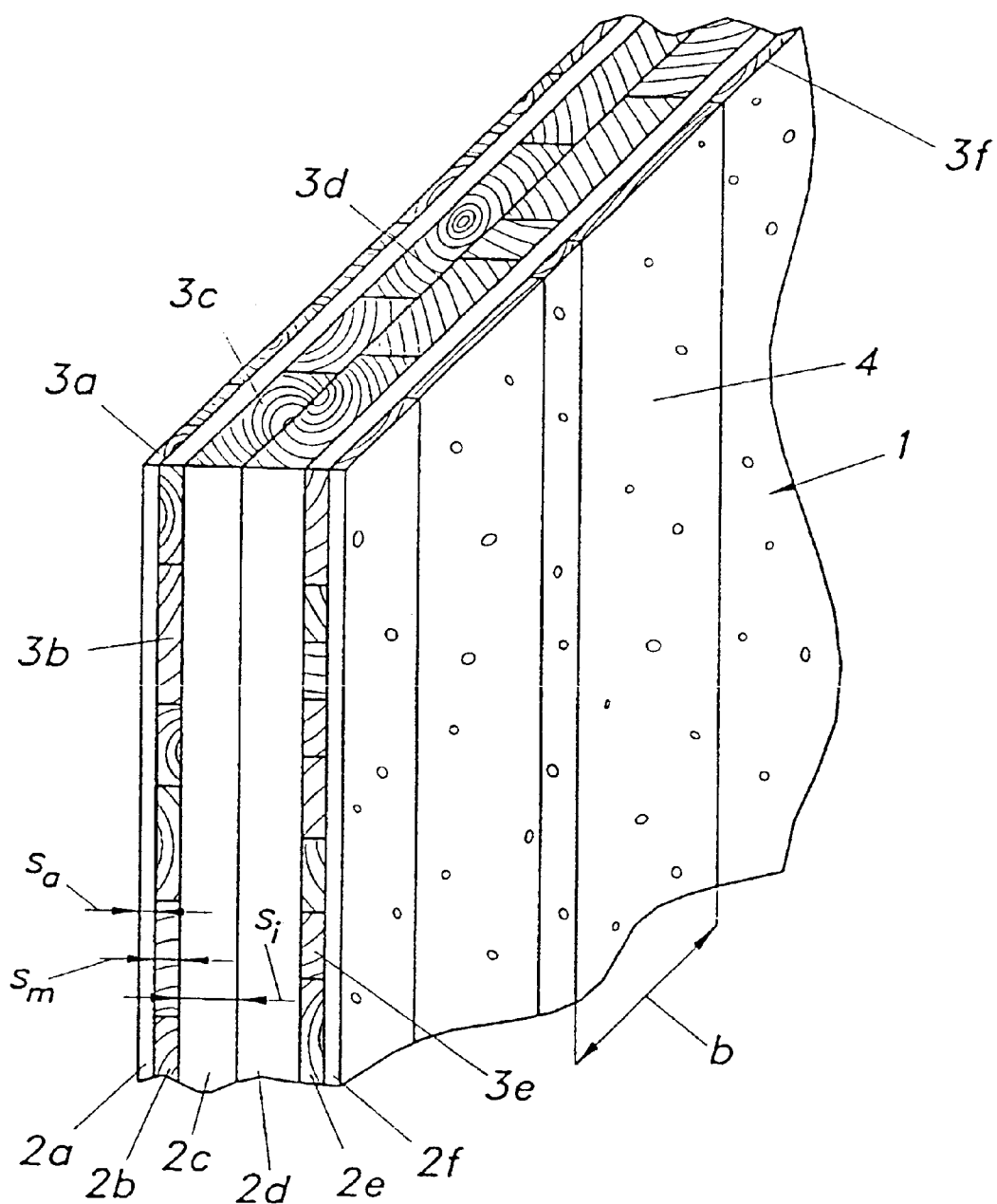

The laminated wood member 1 consists of several layers 2a, 2b, 2c, 2d, 2e, and 2f of pieces of wood 3a, 3b, 3c, 3d, 3e and 3f. Wood 3a, 3b and 3c as well as 3d, 3e and 3f of adjacent layers 2a, 2b, 2c as well as 2d, 2e and 2f extend in different directions. Wood 3c and 3d of the inner layers 2c and 2d are arranged as mounts which are similarly oriented. The thickness $s_i$ of wood 3c, 3d of inner layers 2c and 2d is larger than the thickness $s_a$ and $s_m$ of wood 2a, 2b and 2e and 2f of the outer layers 3a, 3b and 3e and 3f.

The layers 2a through 2f are connected by dowels 4 with one another, which dowels are inserted approximately normal to the layers 2a through 2f into the wood 3a through 3f. The dowels 4 are arranged in the manner of a grid.

The thickness $s_i$, $s_a$, $s_m$ of the layers 2a through 2f can be varied and combined at will between 8 mm and 120 mm depending on the intended purpose and static requirements. A special connecting quality between the individual layers 2a through 2f and the dowels 4 is achieved in that differences in the wood humidity between dowel 4 and the wood 3a to 3f are exploited in a purposeful manner. The dowels 4 are dried in a respectively stronger way than the wood 3a to 3f and thus absorb water from the ambient wood after the dowelling as a result of the humidity balance. This causes a volumetric expansion and an excellent wedging and extraction resistance of the dowels 4. The diameters of the dowels 4 can be between 8 and 40 mm depending on the thickness of the element and the intended application. The length of the dowel varies from the thickness of individual layers 2a through 2f up to the thickness of the entire laminated wood member 1.

Several laminated wood members can be joined together into roof or wall elements by conventional tongue-and-groove joints, common halving or dovetail milling or by screws. Corner joints are thus also possible. Large dowels up to a thickness of 100 mm are additionally used for corner joints, which dowels are used according to the aforementioned principle of purposeful difference in wood humidity.

Figure 2:
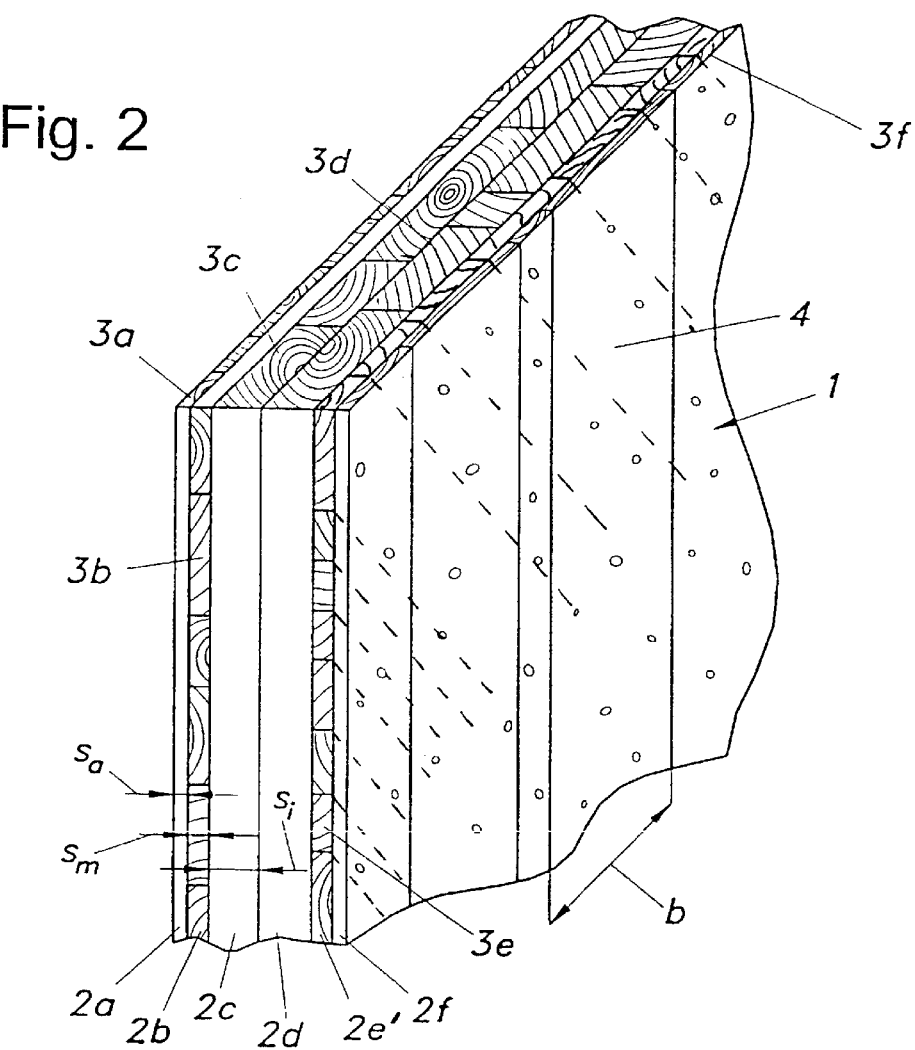
FIG. 2 shows a representation according to FIG. 1 in which a slightly modified laminated wood member is shown, and FIG. 3 schematically shows a partial cross section through a laminated wood member in accordance with the invention.

The laminated wood member of FIG. 2 substantially corresponds to one of FIG. 1. The same components are designated with the same reference numerals. The only difference is that the layer 2e' is composed of pieces of wood 3e' which extend at an angle of 45° to the other pieces of wood. The course of the pieces of wood 3e' is indicated with broken lines.

Figure 3:
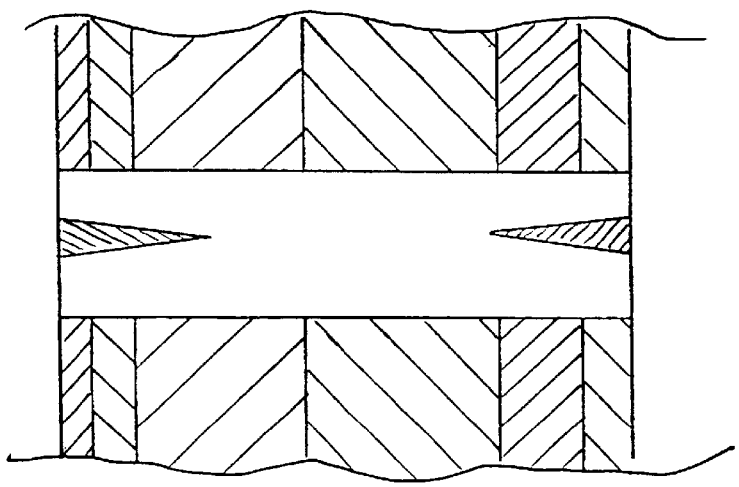

FIG. 3 shows a dowel 4 on an enlarged scale which penetrates the layers, 2a through 2f. A wedge 5 is driven into either face side of dowel 4 in order to secure the dowel 4 when the humidity balance has not yet occurred.

Buildings over several storeys can be realized with the laminated wood members 4 without requiring any additional supporting frames according to the principle of the prefabricated construction method. It is possible to produce single walls covering the height between floors or modularly dimensioned partial elements which extend with modular widths over several storeys.

If several laminated wood members 4 are composed into ceiling or roof elements, they can bridge an area of load lengthwise between two supports. It is similarly possible to produce in this manner ceiling or roof elements in complete lengths of storeys. It is understood that in this case it is obvious that static requirements need to be considered.

It is also understood that both the number of layers as well as the ratio of layers with upright boards to layers with horizontal or diagonally arranged boards can vary randomly.

What is claimed is:

1. A prefabricated laminated wood member consisting of wood and containing no chemical or metallic bonding means, said wood member comprising at least three interconnected layers of immediately adjacent pieces of wood, said pieces of wood of at least two adjacent layers extending in different directions, and including a plurality of dowels which penetrate the layers of wood to connect the layers together.

2. A laminated wood member as claimed in claim 1, wherein the dowels are arranged in a grid pattern.

3. A laminated wood member as claimed in claim 1, including at least two adjacent layers whose pieces of wood extend in the same direction, the pieces of wood in the adjacent layers being mutually offset in a direction of width.

4. A laminated wood member as claimed in claim 1, wherein at least one outer layer of wood is formed by boards.

5. A laminated wood member as claimed in claim 1, wherein a thickness of the layers of wood increases from an outside to an inside, with the thickness of the layers being between about 8 mm and 120 mm.

6. A laminated wood member as claimed in claim 1, wherein a thickness of the layers of wood increases from an inside to an outside, with the thickness of the layers being between about 8 mm and 120 mm.

7. A laminated wood member as claimed in claim 1, wherein at least one layer is provided with a groove-like recess, with the recess being formed by milling or removing adjacent pieces of wood.

8. A laminated wood member as claimed in claim 1, wherein bonding between the dowels and the wood substantially occurs by frictional connection as a result of volumetric expansion by humidity balance between the wood of the layers and the dowels.

9. A laminated wood member as claimed in claim 1, including wedges driven into face sides of the dowels to secure said dowels in place.

10. A laminated wood member as claimed in claim 1, including, in addition to layers whose wood pieces extend mutually parallel or rectangularly, a layer of wood whose pieces of wood extend obliquely to the other layers.

11. A method for producing a laminated wood member as claimed in claim 1, wherein a humidity content of the dowels is decreased under the humidity content of the wood of the layers and the dry dowels are introduced into bores in the layers of wood, with the cross sections of the dowels and the bores being dimensioned in such a way that a frictional connection is produced as a result of the volumetric expansion of the dowels as a result of the humidity balance between the pieces of wood and the dowels.

12. An assembly of laminated wood member as claimed in claim 1, wherein several laminated wood members are joined into large-area units, and wall, ceiling and roof elements, with a connection being made by way of at least one of tongue-and-groove joints, halved joints, dovetail joints and screws.

* * * * *